US010135772B2

(12) United States Patent
Kuang et al.

(10) Patent No.: US 10,135,772 B2
(45) Date of Patent: Nov. 20, 2018

(54) SYSTEMS AND METHODS FOR MESSAGE PROMPTING (71) Applicant: Tencent Technology (Shenzhen) Company Limited, Shenzhen (CN)

(72) Inventors: Junbin Kuang, Shenzhen (CN); Yang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 569 days.

(21) Appl. No.: 14/453,691

(22) Filed: Aug. 7, 2014

(65) Prior Publication Data
US 2015/0081772 A1 Mar. 19, 2015

Related U.S. Application Data (63) Continuation of application No. PCT/CN2014/077084, filed on May 8, 2014.

(30) Foreign Application Priority Data

Sep. 18, 2013 (CN) .......................... 2013 1 0430337

(51) Int. Cl.
H04L 12/58 (2006.01)
(52) U.S. Cl.
CPC .................... H04L 51/24 (2013.01)
(58) Field of Classification Search
None
See application file for complete search history.

(56) References Cited

U.S. PATENT DOCUMENTS

| 7,086,005 B1* | 8/2006 | Matsuda | H04M 7/003 715/706 |
| 8,989,786 B2* | 3/2015 | Feghali | H04W 4/14 345/473 |
| 2007/0005713 A1* | 1/2007 | LeVasseur | H04L 51/14 709/206 |
| 2007/0054679 A1 | 3/2007 | Cho et al. | |
| 2007/0168863 A1* | 7/2007 | Blattner | G06F 3/011 715/706 |

(Continued)

FOREIGN PATENT DOCUMENTS

| CN | 1941708 A | 4/2007 |
| CN | 101188827 A | 5/2008 |

(Continued)

OTHER PUBLICATIONS

Korea Patent Office, Office Action dated Jan. 22, 2016, in Application No. 10-2015-7034284.

(Continued)

Primary Examiner — Shirley Zhang
(74) Attorney, Agent, or Firm — Sughrue Mion, PLLC (57) ABSTRACT Systems and methods are provided for message prompting. For example, a communication client corresponding to a first user acquires a first communication message pushed by a communication server; the communication client acquires avatar information of a second user related to the first communication message; and the communication client displays a prompt of the first communication message in a preset prompting area, wherein the prompt contains the avatar information of the second user.

9 Claims, 9 Drawing Sheets

(56) References Cited

U.S. PATENT DOCUMENTS

| | | | | | |
|---|---|---|---|---|---|
| 2011/0191433 | A1* | 8/2011 | Du | ............................ | H04L 51/36 |
| | | | | | 709/206 |
| 2011/0281568 | A1* | 11/2011 | Le Clech | ............... | H04M 1/575 |
| | | | | | 455/415 |
| 2011/0320538 | A1* | 12/2011 | Ickman | ................... | G06F 9/542 |
| | | | | | 709/206 |
| 2013/0336310 | A1* | 12/2013 | Laasik | .............. | H04L 29/06183 |
| | | | | | 370/352 |
| 2014/0066044 | A1* | 3/2014 | Ramnani | ................. | H04W 8/24 |
| | | | | | 455/418 |

FOREIGN PATENT DOCUMENTS

| | | |
|---|---|---|
| CN | 101409687 | 4/2009 |
| CN | 101540740 A | 9/2009 |
| CN | 102143095 A | 8/2011 |
| CN | 102664830 A | 9/2012 |
| CN | 103117914 A | 5/2013 |
| CN | 103260141 A | 8/2013 |

OTHER PUBLICATIONS

Patent Cooperation Treaty, International Search Report, PCT/CN2014/077084, dated Aug. 15, 2014.
China Patent Office, Office Action dated Feb. 15, 2016, in Application No. 201310430337.1.
China Patent Office, Office Action dated May 19, 2016, in Application No. 201310430337.1.
Patent Cooperation Treaty, Written Opinion of the International Searching Authority, PCT/CN2014/077084, dated Aug. 15, 2014.
Patent Cooperation Treaty, International Preliminary Report on Patentability, PCT/CN2014/077084, dated Mar. 22, 2016.

* cited by examiner

SYSTEMS AND METHODS FOR MESSAGE PROMPTING

CROSS-REFERENCES TO RELATED APPLICATIONS

This application is a continuation of International Application No. PCT/CN2014/077084, with an international filing date of May 8, 2014, now pending, which claims priority to Chinese Patent Application No. 201310430337.1, filed Sep. 18, 2013, both applications being incorporated by reference herein for all purposes.

TECHNICAL FIELD

Certain embodiments of the present invention are directed to computer technology. More particularly, some embodiments of the invention provide systems and methods for network communication. Merely by way of example, some embodiments of the invention have been applied to messages. But it would be recognized that the invention has a much broader range of applicability.

BACKGROUND

With rapid development of the Internet technology, a client of a user usually receives various types of messages from a background server, e.g. friend-recommendation messages, friend-update messages, etc. Currently, upon receipt of the messages, a client normally notifies the user about the number of unread messages. However, the user cannot acquire much information related to the messages and therefore the user normally chooses to ignore the prompts when he/she is busy, which results in unnecessary loss with respect to information transmission.

Hence it is highly desirable to improve the techniques for message prompting.

BRIEF SUMMARY

According to one embodiment, a method is provided for message prompting. For example, a communication client corresponding to a first user acquires a first communication message pushed by a communication server; the communication client acquires avatar information of a second user related to the first communication message; and the communication client displays a prompt of the first communication message in a preset prompting area, wherein the prompt contains the avatar information of the second user.

According to another embodiment, a method is provided for message prompting. For example, a communication message is pushed to a communication client corresponding to a first user; and avatar information of a second user related to the communication message is sent to the communication client corresponding to the first user so that the communication client displays a prompt of the communication message in a preset prompting area, wherein the prompt contains the avatar information of the second user.

According to yet another embodiment, a communication client using a communication account of a first user includes: a communication-message-receiving module configured to acquire a first communication message pushed by a communication server, an avatar-information-acquisition module configured to acquire avatar information of a second user related to the first communication message, and a message-prompting module configured to display a prompt of the first communication message in a preset prompting area, wherein the prompt contains the avatar information of the second user.

In one embodiment, a communication server includes: a message-pushing module configured to push a communication message to a communication client corresponding to a first user and send avatar information of a second user related to the communication message to the communication client corresponding to the first user so that the communication client displays a prompt of the communication message in a preset prompting area, wherein the prompt contains the avatar information of the second user.

In another embodiment, a message-prompting system includes: a communication client and a communication server. The communication client is configured to: use a communication account of a first user, acquire a communication message pushed by the communication server, acquire avatar information of a second user related to the communication message, and display a prompt of the communication message in a preset prompting area, wherein the prompt contains the avatar information of the second user. The communication server is configured to push a communication message to the communication client.

In yet another embodiment, a non-transitory computer readable storage medium includes programming instructions for message prompting. The programming instructions are configured to cause one or more data processors to execute certain operations. For example, a communication client corresponding to a first user acquires a first communication message pushed by a communication server; the communication client acquires avatar information of a second user related to the first communication message; and the communication client displays a prompt of the first communication message in a preset prompting area, wherein the prompt contains the avatar information of the second user.

In yet another embodiment, a non-transitory computer readable storage medium includes programming instructions for message prompting. The programming instructions are configured to cause one or more data processors to execute certain operations. For example, a communication message is pushed to a communication client corresponding to a first user; and avatar information of a second user related to the communication message is sent to the communication client corresponding to the first user so that the communication client displays a prompt of the communication message in a preset prompting area, wherein the prompt contains the avatar information of the second user.

For example, the systems and methods described herein are configured to notify a first user directly of a second user associated with a communication message by displaying avatar information of the second user associated with the communication message when providing a prompt of receiving the communication message so that the first user can selectively handle the received communication message to avoid missing any messages.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
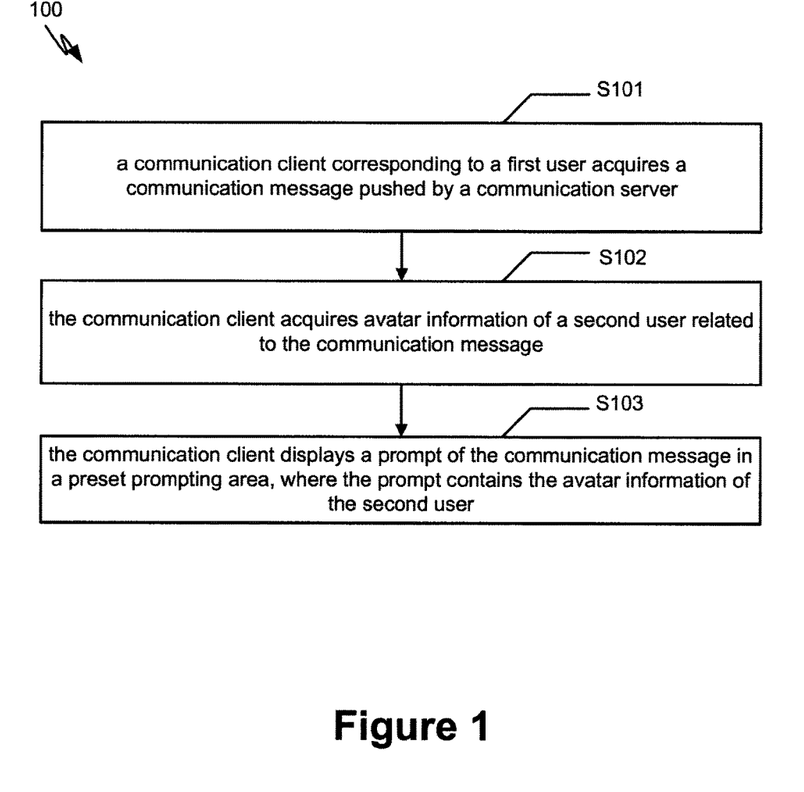
FIG. 1 is a simplified diagram showing a method for message prompting according to one embodiment of the present invention.

FIG. 1 is a simplified diagram showing a method for message prompting according to one embodiment of the present invention. This diagram is merely an example, which should not unduly limit the scope of the claims. One of ordinary skill in the art would recognize many variations, alternatives, and modifications. The method 100 includes at least the processes S101-S103.

According to certain embodiments, a communication client refers to a communication program that runs on a terminal, such as an instant messaging client, a social-networking-services (SNS) client, etc. For example, a client can call and use certain hardware in the terminal via an interface provided by an operating system. As an example, a terminal includes a personal computer (PC), a tablet computer, a cell phone, a smart phone and a laptop computer. In one example, a communication client is connected to a communication server by logging onto a client account corresponding to a user. In another example, a communication server includes a background server that provides services to a communication client, such as an instant messaging server, a SNS server, etc.

According to one embodiment, during the process S101, a communication client corresponding to a first user acquires a communication message pushed by a communication server. For example, the communication message is sent by a second user to the first user via the communication server, e.g. a friend request message, an instant message, or an update message of any user associated with the first user that is actively pushed by the communication server to the communication client. For instance, if the client account of the first user is an SNS account, a friend in an associated instant messaging account also registers an SNS account on the corresponding SNS server, i.e. a second user. The SNS server may push a friend recommendation message to the communication client corresponding to the first user, recommending the first user to add the second user as a friend. As an example, an instant message or an SNS message can be directly associated with a particular user, such as an initial transmitter of the communication message, a user that the communication server recommends to the communication client, or a user whose updates are prompted in the communication message. Thus, a relevant user (e.g., the second user) can be determined for an instant message or an SNS message. In some embodiments, the communication message may carry the avatar information of the second user. In certain embodiments, the communication message may contain the identifier information of the second user. For example, the identifier information of the second user may be a user account, a user code or any other identifier uniquely corresponding to the second user.

According to another embodiment, during the process S102, the communication client acquires avatar information of a second user related to the communication message. For example, the communication server can add the avatar information of the second user in the communication message in advance so that the communication client can directly acquire the avatar information of the second user related to the communication message from the communication message. In another example, the communication message may contain the identifier information of the second user and the communication client can acquire the avatar information of the second user from the communication server according to the identifier information of the second user.

Figure 8:
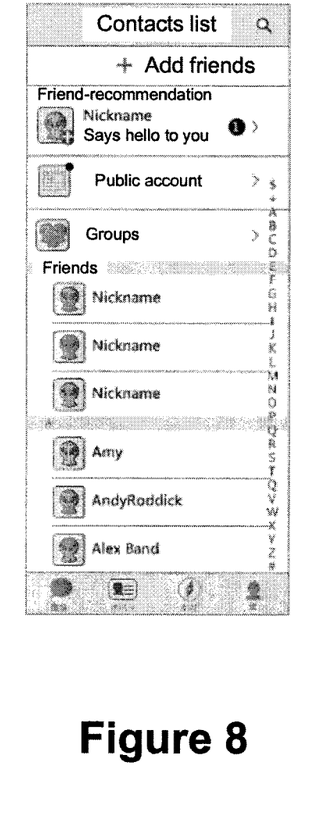
FIG. 8 is a simplified diagram showing an interface for message prompting according to one embodiment of the present invention.

According to yet another embodiment, during the process S103, the communication client displays a prompt of the communication message in a preset prompting area, where the prompt contains the avatar information of the second user. For example, a prompt of the communication message includes an unread prompt or notice to inform the user upon receiving a new message or to notify the user of unread communication messages. In another example, the communication client can display a prompt of the communication message in a friend recommendation area of the interface (e.g., as shown in FIG. 8). As an example, the prompt includes the avatar information of the second user related to the communication message and further some key data of the communication message, e.g. a type of the communication message and an abstract of the communication message.

FIG. 8 is a simplified diagram showing an interface for message prompting according to one embodiment of the present invention. This diagram is merely an example, which should not unduly limit the scope of the claims. One of ordinary skill in the art would recognize many variations, alternatives, and modifications. As shown in FIG. 8, it is indicated that a user "Nickname" "says hello to you," according to certain embodiments.

Figure 2:
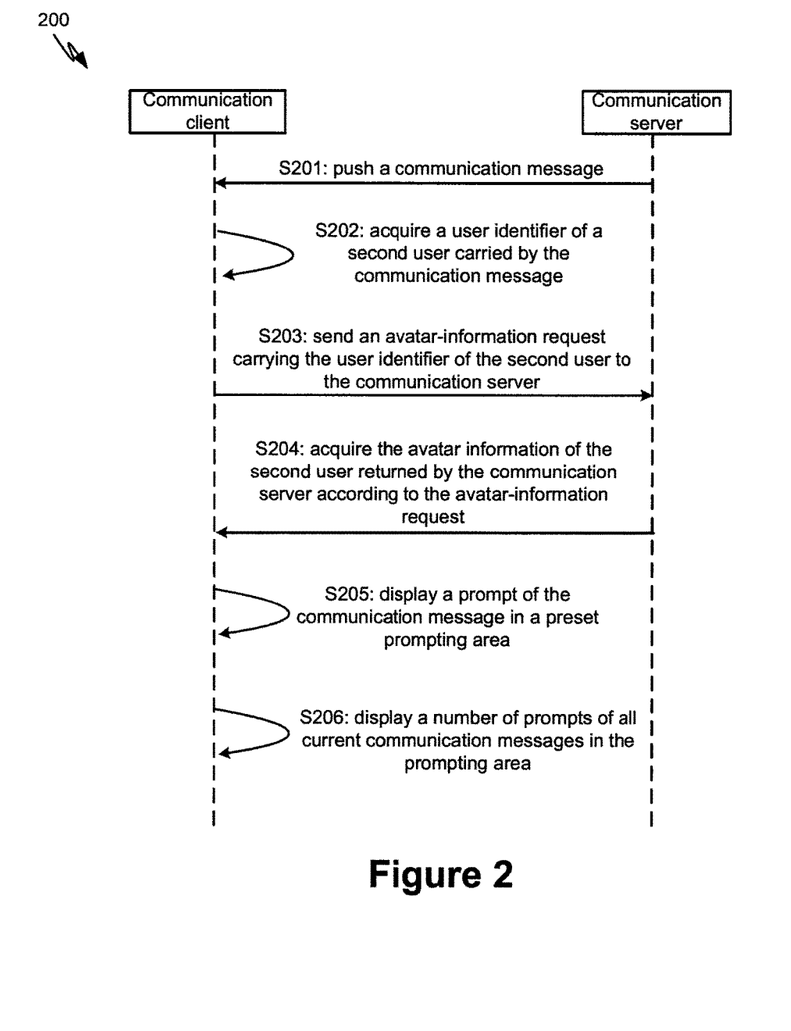
FIG. 2 is a simplified diagram showing a method for message prompting according to another embodiment of the present invention.

FIG. 2 is a simplified diagram showing a method for message prompting according to another embodiment of the present invention. This diagram is merely an example, which should not unduly limit the scope of the claims. One of ordinary skill in the art would recognize many variations, alternatives, and modifications. The method 200 includes at least the processes S201-S206.

According to one embodiment, during the process S201, a communication server pushes a communication message to a communication client corresponding to a first user. For example, the communication message may be sent by a second user to the first user via the communication server, e.g. a friend request message, an instant message, or an update message of any user associated with the first user that is actively pushed by the communication server to the communication client. For instance, if the client account of the first user is an SNS account, a friend in an associated instant messaging account also registers an SNS account on the corresponding SNS server, i.e. a second user. The SNS server may push a friend recommendation message to the communication client corresponding to the first user, recommending the first user to add the second user as a friend. As an example, an instant message or an SNS message can be directly associated with a particular user, such as an initial transmitter of the communication message, a user that the communication server recommends to the communication client, or a user whose updates are prompted in the communication message. Thus, a relevant user (e.g., the second user) can be determined for an instant message or an SNS message. In some embodiments, the communication message may carry the avatar information of the second user. In certain embodiments, the communication message may contain the identifier information of the second user.

According to another embodiment, during the process S202, the communication client acquires a user identifier of the second user carried by the communication message pushed by the communication server. For example, the identifier information of the second user may be a user account, a user code or any other identifier uniquely corresponding to the second user. In another example, during the process S203, the communication client sends an avatar-information request to the communication server, where the avatar-information request carries the user identifier of the second user.

According to yet another embodiment, during the process S204, the communication client acquires the avatar information of the second user returned by the communication server according to the avatar-information request. For example, the communication server can search a user database for user data corresponding to the user identifier according to the avatar-information request sent by the communication client and return the avatar information of the second user to the communication client. In another example, during the process S205, the communication client displays a prompt of the communication message in a preset prompting area, where the prompt contains the avatar information of the second user. In yet another example, a prompt of the communication message includes an unread prompt or notice to inform the user upon receiving a new message or to notify the user of unread communication messages. In another example, the communication client can display a prompt of the communication message in a friend recommendation area of the interface (e.g., as shown in FIG. 8). The prompt includes the avatar information of the second user related to the communication message and further some key data of the communication message, e.g. a type of the communication message and an abstract of the communication message. FIG. 8 shows a user "Nickname" "says hello to you," according to certain embodiments.

According to yet another embodiment, before displaying the prompt of the communication message, the communication client may first check if there is any prompt of any other communication message. For example, in response to one or more prompts of one or more other communication messages, the communication client sorts and displays the communication message and the one or more other communication messages in the prompting area according to a time sequence at which the communication message and the one or more other communication messages are received.

Figure 9:
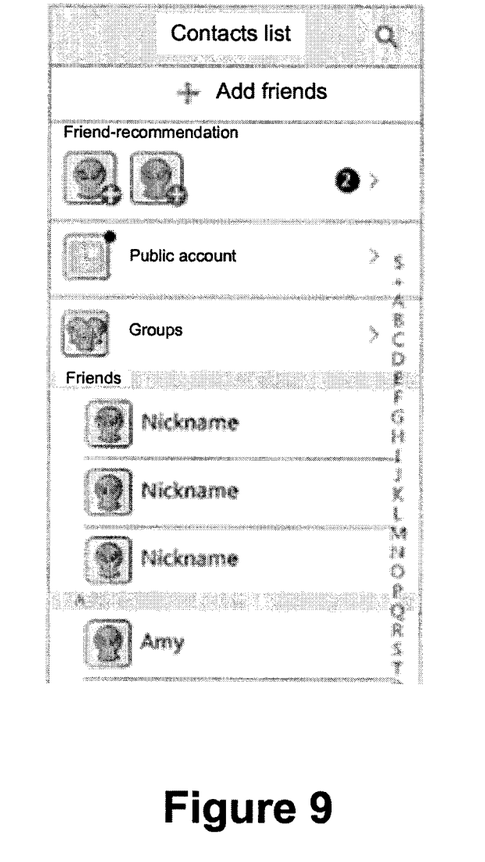
FIG. 9 is a simplified diagram showing an interface for message prompting according to another embodiment of the present invention.

FIG. 9 is a simplified diagram showing an interface for message prompting according to another embodiment of the present invention. This diagram is merely an example, which should not unduly limit the scope of the claims. One of ordinary skill in the art would recognize many variations, alternatives, and modifications.

As shown in FIG. 9, a communication client sorts and displays one or more prompts of a plurality of communication messages in sequence in a preset prompting area, in some embodiments. The prompt of each communication message displays avatar information of a second user related to the communication message so that a first user can know the avatar of the second user related to each communication message and selectively handle the received communication message to avoid missing any messages, according to certain embodiments.

Referring back to FIG. 2, during the process S206, the communication client displays a number of prompts of all current communication messages in the prompting area, in some embodiments. For example, the communication client can detect the number of all existing prompts and hence display the number of prompts of all current communication messages in the preset prompt area. As shown in FIG. 9, if there are two prompts, a number "②" is shown at the right side of the preset prompting area to prompt the user that two new communication messages need to be handled, according to certain embodiments.

Figure 3:
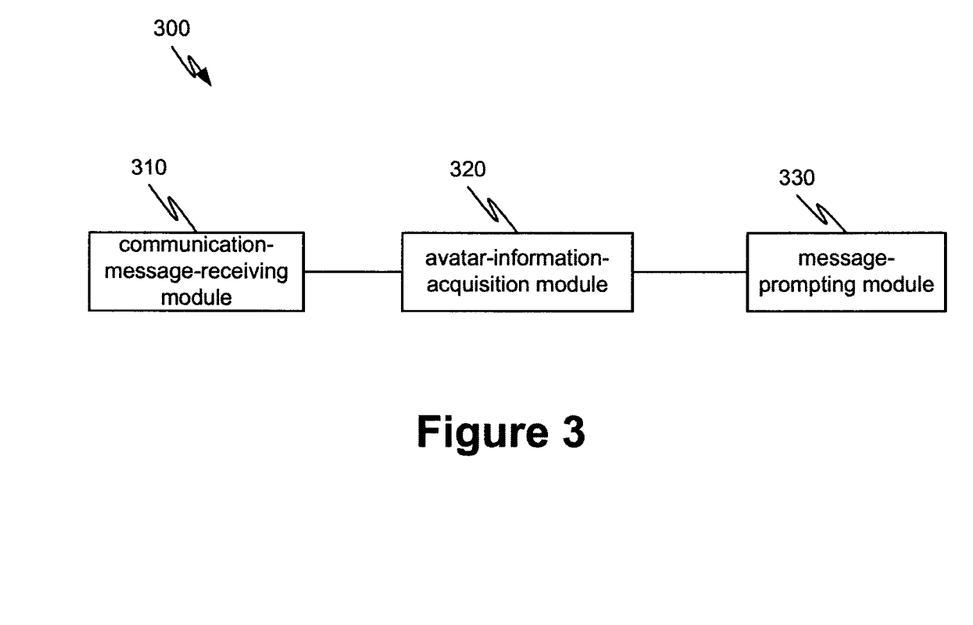
FIG. 3 is a simplified diagram showing a communication client according to one embodiment of the present invention.

FIG. 3 is a simplified diagram showing a communication client according to one embodiment of the present invention. This diagram is merely an example, which should not unduly limit the scope of the claims. One of ordinary skill in the art would recognize many variations, alternatives, and modifications.

According to certain embodiments, a communication client refers to a communication program that runs on a terminal, such as an instant messaging client, a social-networking-services (SNS) client, etc. For example, a client can call and use certain hardware in the terminal via an interface provided by an operating system. As an example, a terminal includes a personal computer (PC), a tablet computer, a cell phone, a smart phone and a laptop computer. In one example, a communication client is connected to a communication server by logging onto a client account corresponding to a user. In another example, a communication server includes a background server that provides services to a communication client, such as an instant messaging server, a SNS server, etc.

As shown in FIG. 3, the communication client 300 includes: a communication-message-receiving module 310 configured to acquire a communication message pushed by a communication server, according to one embodiment. For example, the communication message is sent by a second user to the first user via the communication server, e.g. a friend request message, an instant message, or an update message of any user associated with the first user that is actively pushed by the communication server to the communication client. For instance, if the client account of the first user is an SNS account, a friend in an associated instant messaging account also registers an SNS account on the corresponding SNS server, i.e. a second user. The SNS server may push a friend recommendation message to the communication client corresponding to the first user, recommending the first user to add the second user as a friend. As an example, an instant message or an SNS message can be directly associated with a particular user, such as an initial transmitter of the communication message, a user that the communication server recommends to the communication client, or a user whose updates are prompted in the communication message. Thus, a relevant user (e.g., the second user) can be determined for an instant message or an SNS message. In some embodiments, the communication message may carry the avatar information of the second user. In certain embodiments, the communication message may contain the identifier information of the second user.

According to another embodiment, the communication client 300 further includes an avatar-information-acquisition module 320 configured to acquire avatar information of a second user related to the communication message. For example, if the communication message pushed by the communication server carries the avatar information of the second user, the avatar-information-acquisition module 320 directly acquires from the communication message the avatar information of the second user related to the communication message. In another example, the communication message may carry the identifier information of the second user and the avatar-information-acquisition module 320 can acquire the avatar information of the second user from the communication server according to the identifier information of the second user.

Figure 4:
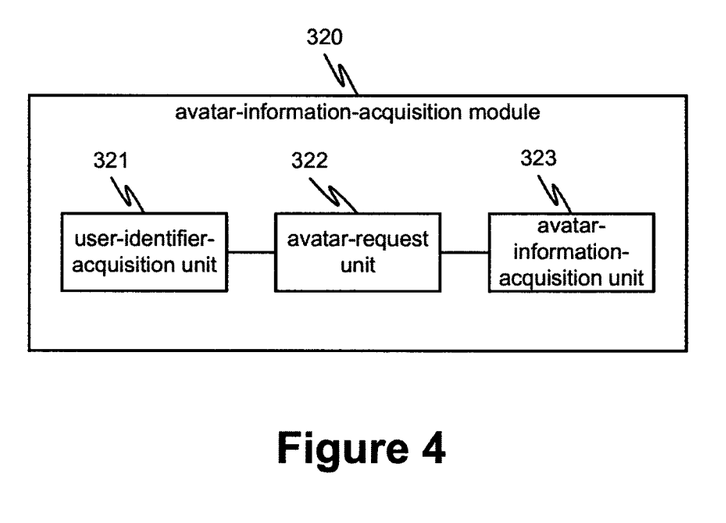
FIG. 4 is a simplified diagram showing an avatar-information-acquisition module as part of a communication client according to one embodiment of the present invention.

FIG. 4 is a simplified diagram showing the avatar-information-acquisition module 320 as part of the communication client 300 according to one embodiment of the present invention. This diagram is merely an example, which should not unduly limit the scope of the claims. One of ordinary skill in the art would recognize many variations, alternatives, and modifications.

According to one embodiment, the avatar-information-acquisition module 320 includes: a user-identifier-acquisition unit 321 configured to acquire a user identifier of the second user carried by the communication message pushed by the communication server. For example, the identifier information of the second user may be a user account, a user code or any other identifier uniquely corresponding to the second user. In another example, the avatar-information-acquisition module 320 further includes an avatar-request unit 322 configured to send an avatar-information request to the communication server, where the avatar-information request carries the user identifier of the second user. In yet another example, the avatar-information-acquisition module 320 further includes an avatar-information-acquisition unit 323 configured to acquire the avatar information of the second user returned by the communication server according to the avatar-information request. In yet another example, the communication server can search a user database for user data corresponding to the user identifier according to the avatar-information request sent by the communication client and hence return the avatar information of the second user to the communication client. The avatar-information-acquisition unit 323 hence can acquire the avatar information of the second user, in certain embodiments.

Referring back to FIG. 3, the communication client 300 further includes a message-prompting module 330 configured to display a prompt of the communication message in a preset prompting area, where the prompt contains the avatar information of the second user, in some embodiments. For example, a prompt of the communication message includes an unread prompt or notice to inform the user upon receiving a new message or to notify the user of unread communication messages. In another example, the message-prompting module 330 can display a prompt of the communication message in a friend recommendation area of the interface (e.g., as shown in FIG. 8). As an example, the prompt includes the avatar information of the second user related to the communication message and further some key data of the communication message, e.g. a type of the communication message and an abstract of the communication message. FIG. 8 shows a user "Nickname" "says hello to you," in certain embodiments.

Figure 5:
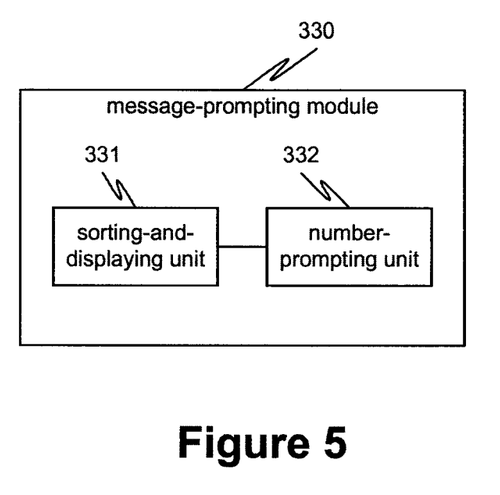
FIG. 5 is a simplified diagram showing a message-prompting module as part of a communication client according to one embodiment of the present invention.

FIG. 5 is a simplified diagram showing the message-prompting module 330 as part of the communication client 300 according to one embodiment of the present invention. This diagram is merely an example, which should not unduly limit the scope of the claims. One of ordinary skill in the art would recognize many variations, alternatives, and modifications.

According to one embodiment, the message-prompting module 330 includes a sorting-and-displaying unit 331 configured to, in response to one or more prompts of one or more other communication messages, sort and display the communication message and one or more other communication messages in the prompting area according to a time sequence at which the communication message and the one or more other communication messages are received. For example, before displaying the prompt of the communication message, the sorting-and-displaying unit 331 can first check if there is any prompt of any other communication message. As an example, in response to one or more prompts of one or more other communication messages, the sorting-and-displaying unit 331 sorts and displays the communication message and the one or more other communication messages in the prompting area according to a time sequence at which the communication message and the one or more other communication messages are received. As shown in FIG. 9, a communication client sorts and displays one or more prompts of a plurality of communication messages in sequence in a preset prompting area, in some embodiments. The prompt of each communication message displays avatar information of a second user related to the communication message so that a first user can know the avatar of the second user related to each communication message and selectively handle the received communication message to avoid missing any messages, according to certain embodiments.

According to another embodiment, the message-prompting module 330 further includes: a number-prompting unit 332 configured to display the number of prompts of all current communication messages in the prompting area. For example, the number-prompting unit 332 can detect the number of all existing prompts and hence display the number of prompts of all current communication messages in the preset prompting area. As shown in FIG. 9, if there are two prompts, a number "②" is shown at the right side of the preset prompting area to prompt the user that two new communication messages need to be handled, according to certain embodiments.

Figure 6:
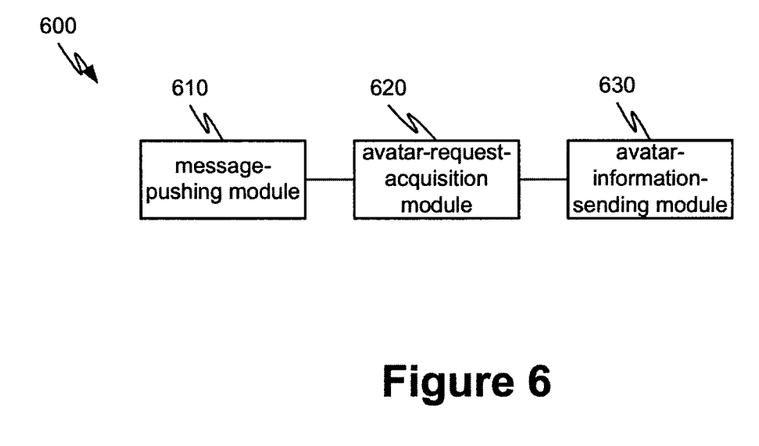
FIG. 6 is a simplified diagram showing a communication server according to one embodiment of the present invention.

FIG. 6 is a simplified diagram showing a communication server according to one embodiment of the present invention. This diagram is merely an example, which should not unduly limit the scope of the claims. One of ordinary skill in the art would recognize many variations, alternatives, and modifications.

According to some embodiments, a communication server includes a background server that provides services to a communication client, such as an instant messaging server, a SNS server, etc. As shown in FIG. 6, the communication server 600 includes a message-pushing module 610 configured to push a communication message to a communication client corresponding to a first user and send avatar information of a second user related to the communication message to the communication client corresponding to the first user so that the communication client displays a prompt of the communication message in a preset prompting area, where the prompt contains the avatar information of the second user, in some embodiments. For example, the communication message is sent by a second user to the first user via the communication server, e.g. a friend request message, an instant message, or an update message of any user associated with the first user that is actively pushed by the communication server to the communication client. For instance, if the client account of the first user is an SNS account, a friend in an associated instant messaging account also registers an SNS account on the corresponding SNS server, i.e. a second user. In another example, the message-pushing module 610 is configured to push a friend recommendation message to the communication client corresponding to the first user, recommending the first user to add the second user as a friend. As an example, an instant message or an SNS message can be directly associated with a particular user, such as an initial transmitter of the communication message, a user that the communication server recommends to the communication client, or a user whose updates are prompted in the communication message. Thus, a relevant user (e.g., the second user) can be determined for an instant message or an SNS message. In some embodiments, the communication message may carry the avatar information of the second user. In certain embodiments, the communication message may contain the identifier information of the second user.

According to one embodiment, the communication server 300 further includes: an avatar-request-acquisition module 620 configured to acquire an avatar-information request sent by the communication client corresponding to the first user, where the avatar-information request carries the user identifier of the second user. For example, the identifier information of the second user includes a user account, a user code or any other identifier uniquely corresponding to the second user. In another example, the communication server 300 further includes an avatar-information-sending module 630 configured to send the avatar information of the second user to the communication client corresponding to the first user according to the avatar-information request. In yet another example, the avatar-information-sending module 630 can search a user database for user data corresponding to the user identifier according to the avatar-information request sent by the communication client and hence return the avatar information of the second user to the communication client.

Figure 7:
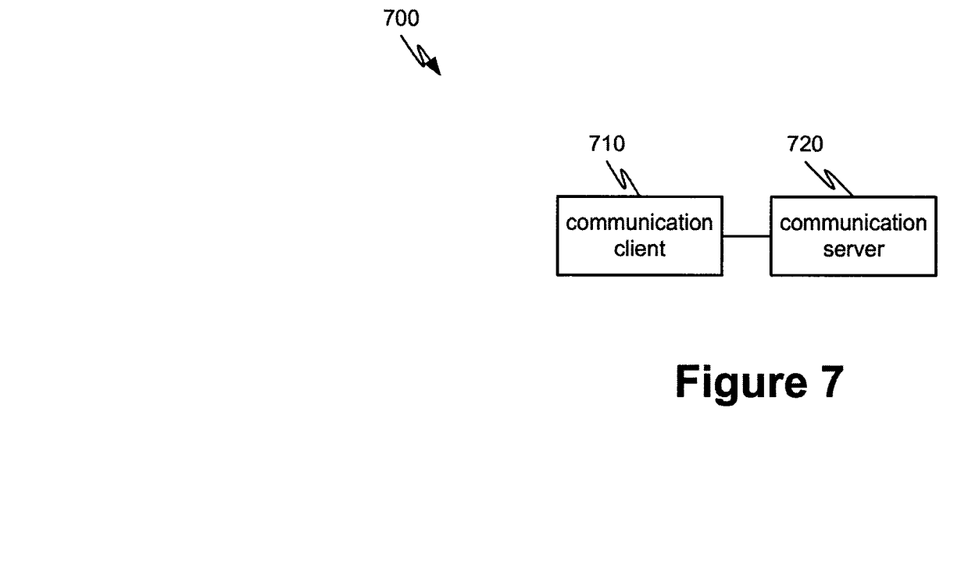
FIG. 7 is a simplified diagram showing a message-prompting system according to one embodiment of the present invention.

FIG. 7 is a simplified diagram showing a message-prompting system according to one embodiment of the present invention. This diagram is merely an example, which should not unduly limit the scope of the claims. One of ordinary skill in the art would recognize many variations, alternatives, and modifications. The message-prompting system 700 includes a communication client 710 and a communication server 720.

According to one embodiment, the communication client 710 is the same as the communication client 300 as shown in FIGS. 3-5. For example, the communication client 710 uses a communication account of a first user and is configured to acquire a communication message pushed by the communication server 720, acquire avatar information of a second user related to the communication message and display a prompt of the communication message in a preset prompting area, where the prompt contains the avatar information of the second user. As an example, the communication server 720 is the same as the communication server 600 as shown in FIG. 6. For example, the communication server 720 is configured to push a communication message to communication client 710.

According to yet another embodiment, a method is provided for message prompting. For example, a communication client corresponding to a first user acquires a first communication message pushed by a communication server; the communication client acquires avatar information of a second user related to the first communication message; and the communication client displays a prompt of the first communication message in a preset prompting area, wherein the prompt contains the avatar information of the second user. For example, the method is implemented according to at least FIG. 1 and/or FIG. 2.

In one embodiment, a method is provided for message prompting. For example, a communication message is pushed to a communication client corresponding to a first user; and avatar information of a second user related to the communication message is sent to the communication client corresponding to the first user so that the communication client displays a prompt of the communication message in a preset prompting area, wherein the prompt contains the avatar information of the second user. For example, the method is implemented according to at least FIG. 2.

In another embodiment, a communication client using a communication account of a first user includes: a communication-message-receiving module configured to acquire a first communication message pushed by a communication server, an avatar-information-acquisition module configured to acquire avatar information of a second user related to the first communication message, and a message-prompting module configured to display a prompt of the first communication message in a preset prompting area, wherein the prompt contains the avatar information of the second user. For example, the communication client is implemented according to at least FIG. 3, FIG. 4, and/or FIG. 5.

In yet another embodiment, a communication server includes: a message-pushing module configured to push a communication message to a communication client corresponding to a first user and send avatar information of a second user related to the communication message to the communication client corresponding to the first user so that the communication client displays a prompt of the communication message in a preset prompting area, wherein the prompt contains the avatar information of the second user. For example, the communication server is implemented according to at least FIG. 6.

According to one embodiment, a message-prompting system includes: a communication client and a communication server. The communication client is configured to: use a communication account of a first user, acquire a communication message pushed by the communication server, acquire avatar information of a second user related to the communication message, and display a prompt of the communication message in a preset prompting area, wherein the prompt contains the avatar information of the second user. The communication server is configured to push a communication message to the communication client.

According to another embodiment, a non-transitory computer readable storage medium includes programming instructions for message prompting. The programming instructions are configured to cause one or more data processors to execute certain operations. For example, a communication client corresponding to a first user acquires a first communication message pushed by a communication server; the communication client acquires avatar information of a second user related to the first communication message; and the communication client displays a prompt of the first communication message in a preset prompting area, wherein the prompt contains the avatar information of the second user. For example, the storage medium is implemented according to at least FIG. 1 and/or FIG. 2.

According to yet another embodiment, a non-transitory computer readable storage medium includes programming instructions for message prompting. The programming instructions are configured to cause one or more data processors to execute certain operations. For example, a communication message is pushed to a communication client corresponding to a first user; and avatar information of a second user related to the communication message is sent to the communication client corresponding to the first user so that the communication client displays a prompt of the communication message in a preset prompting area, wherein the prompt contains the avatar information of the second user. For example, the storage medium is implemented according to at least FIG. 2.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for notifying a first user of a first communication message sent from a second user via a communication server, the method comprising:
   acquiring, by a communication client corresponding to the first user comprising a data processor, the first communication message pushed by the communication server;
   upon receipt of the first communication message and responsive to the first communication message, acquiring, by the communication client, avatar information of the second user; and
   generating, by the communication client, a prompt of the first communication message in a preset prompting area in the communication client, wherein the prompt comprises the avatar information of the second user;
   wherein the acquiring, by the communication client, the avatar information of the second user includes:

acquiring, by the communication client, a user identifier of the second user carried by the first communication message;

sending, by the communication client, an avatar-information request to the communication server, wherein the avatar-information request carries the user identifier of the second user; and acquiring, by the communication client, the avatar information of the second user returned by the communication server according to the avatar-information request.

2. The method of claim 1, wherein the generating includes:

in response to one or more prompts of one or more second communication messages, generating, by the communication client, a prompt of the first communication message and of the one or more second communication messages in the preset prompting area according to a time sequence at which the first communication message and the one or more second communication messages respectively are received.

3. The method of claim 2, the prompt further comprising:
a number of prompts of all communication messages in the preset prompting area.

4. A method for notifying a first user of a communication message sent from a second user via a communication server, the method comprising:

pushing, to a communication client corresponding to the first user comprising a data processor, the communication message; and responsive to the communication message, sending, to the communication client, avatar information of the second user so that the communication client generates a prompt of the communication message in a preset prompting area in the communication client, wherein the prompt comprises the avatar information of the second user, wherein:

the communication message carries a user identifier of the second user; and the sending includes:

acquiring an avatar-information request sent by the communication client in response to the communication message, wherein the avatar-information request carries the user identifier of the second user; and sending the avatar information of the second user to the communication client according to the avatar-information request.

5. A communication client corresponding to a first user for notifying the first user of a first communication message sent from a second user via a communication server, the communication client comprising:

a hardware data processor; and a computer-readable storage medium storing a communication-message-receiving module, an avatar-information-acquisition module, and a message-prompting module;

wherein the communication-message-receiving module is configured to cause the data processor to acquire the first communication message pushed by the communication server;

wherein the avatar-information-acquisition module is configured to cause the data processor to acquire, after receipt of the first communication message and responsive to the first communication message, avatar information of the second user; and wherein the message-prompting module is configured to generate a prompt of the first communication message in a preset prompting area in the communication client, wherein the prompt comprises the avatar information of the second user, wherein the avatar-information-acquisition module includes:

a user-identifier-acquisition unit configured to cause the data processor to acquire a user identifier of the second user carried by the first communication message;

an avatar-request unit configured to cause the data processor to send an avatar information request to the communication server, wherein the avatar-information request carries the user identifier of the second user; and an avatar-information-acquisition unit configured to cause the data processor to acquire the avatar information of the second user returned by the communication server according to the avatar-information request.

6. The communication client of claim 5, wherein the message-prompting module includes:

a sorting-and-displaying unit configured to cause the data processor to, in response to one or more prompts of one or more second communication messages, generate a prompt of the first communication message and the one or more second communication messages in the preset prompting area according to a time sequence at which the first communication message and the one or more second communication messages respectively are received.

7. The communication client of claim 5, wherein the prompt generated by the message-prompting module further includes:

a number of prompts of all communication messages in the preset prompting area.

8. A communication server for notifying a first user of a communication message sent by a second user via the communication server, the communication server comprising:

a hardware data processor; and a computer-readable storage medium storing a message-pushing module configured to cause the data processor to:

push the communication message to a communication client corresponding to the first user; and responsive to the communication message, send, to the communication client, avatar information of the second user so that the communication client generates a prompt of the communication message in a preset prompting area in the communication client, wherein the prompt comprises the avatar information of the second user, wherein:

the communication message carries a user identifier of the second user; and the computer-readable medium further stores an avatar-request-acquisition module and an avatar-information-sending module, wherein:

the avatar-request-acquisition module is configured to cause the data processor to acquire an avatar-information request sent by the communication client, wherein the avatar-information request carries the user identifier of the second user; and the avatar-information-sending module is configured to cause the data processor to send the avatar information of the second user to the communication client according to the avatar-information request.

9. A system for notifying a first user of a first communication message sent from a second user via a communication server, the system comprising:
- a communication client corresponding to the first user and including a hardware data processor configured to:
- acquire the communication message pushed by the communication server;
- upon receipt of the communication message and responsive to the communication message, acquire avatar information of the second user; and
- generate a prompt of the communication message in a preset prompting area in the communication client,
- wherein the prompt comprises the avatar information of the second user, and the communication server is configured to push the communication message to the communication client,
- wherein acquiring, by the communication client, the avatar information of the second user includes:
- acquiring, by the communication client, a user identifier of the second user carried by the communication message;
- sending, by the communication client, an avatar-information request to the communication server, wherein the avatar-information request carries the user identifier of the second user; and
- acquiring, by the communication client, the avatar information of the second user returned by the communication server according to the avatar-information request.

* * * * *